Sheet 1 - 6 Sheets

C. H. McCormick.

Mower.

No 825

Reissued Sept. 20, 1859

EXAMINER'S ROOM.

Sheet 2 6 Sheets

C. H. McCormick
Mower

No
No
No 825

Reissued Sept 20, 1859

Sheet 3 - 6 Sheets

C. H. Mc Cormick.

Mower.

No 825 Reissued Sept. 20, 1859

Sheet 4 - 6 Sheets

C. H. McCormick.
Mower.

No. 825 Reissued Sept. 20, 1859

Sheet 5 - 6 Sheets

C. H. McCormick.
Mower.

No 825 Reissued Sept. 20, 1859

Sheet 6 – 6 Sheets

C. H. McCormick.

Mower.

No 825

Reissued Sept. 20, 1859

UNITED STATES PATENT OFFICE.

CYRUS H. McCORMICK, OF CHICAGO, ILLINOIS.

IMPROVEMENT IN REAPING-MACHINES.

Specification forming part of Letters Patent No. 5,335, dated October 23, 1847; Reissue No. 239, dated May 24, 1853; Reissue No. 637, dated December 21, 1858; Reissue No. 825, dated September 20, 1859.

DIVISION J.

*To all whom it may concern:*

Be it known that I, CYRUS H. McCORMICK, of Chicago, in the county of Cook and State of Illinois, have invented a new and useful Improvement in Reaping-Machines, of which the following is a full, clear, and exact description, reference being had to the accompanying drawings, making part of this specification, in which—

Figure 1:
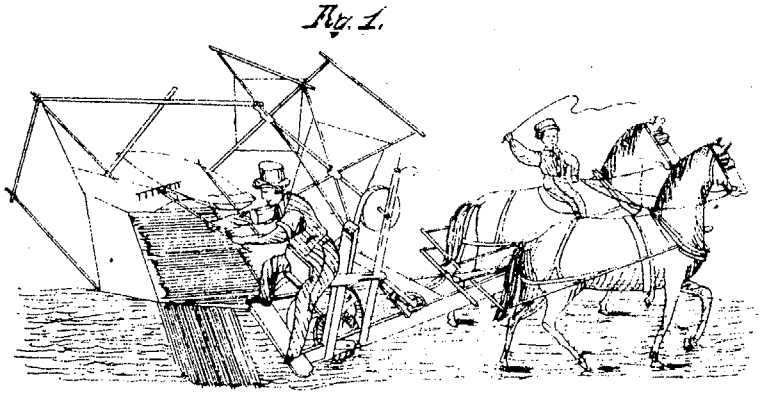
Figure 2:
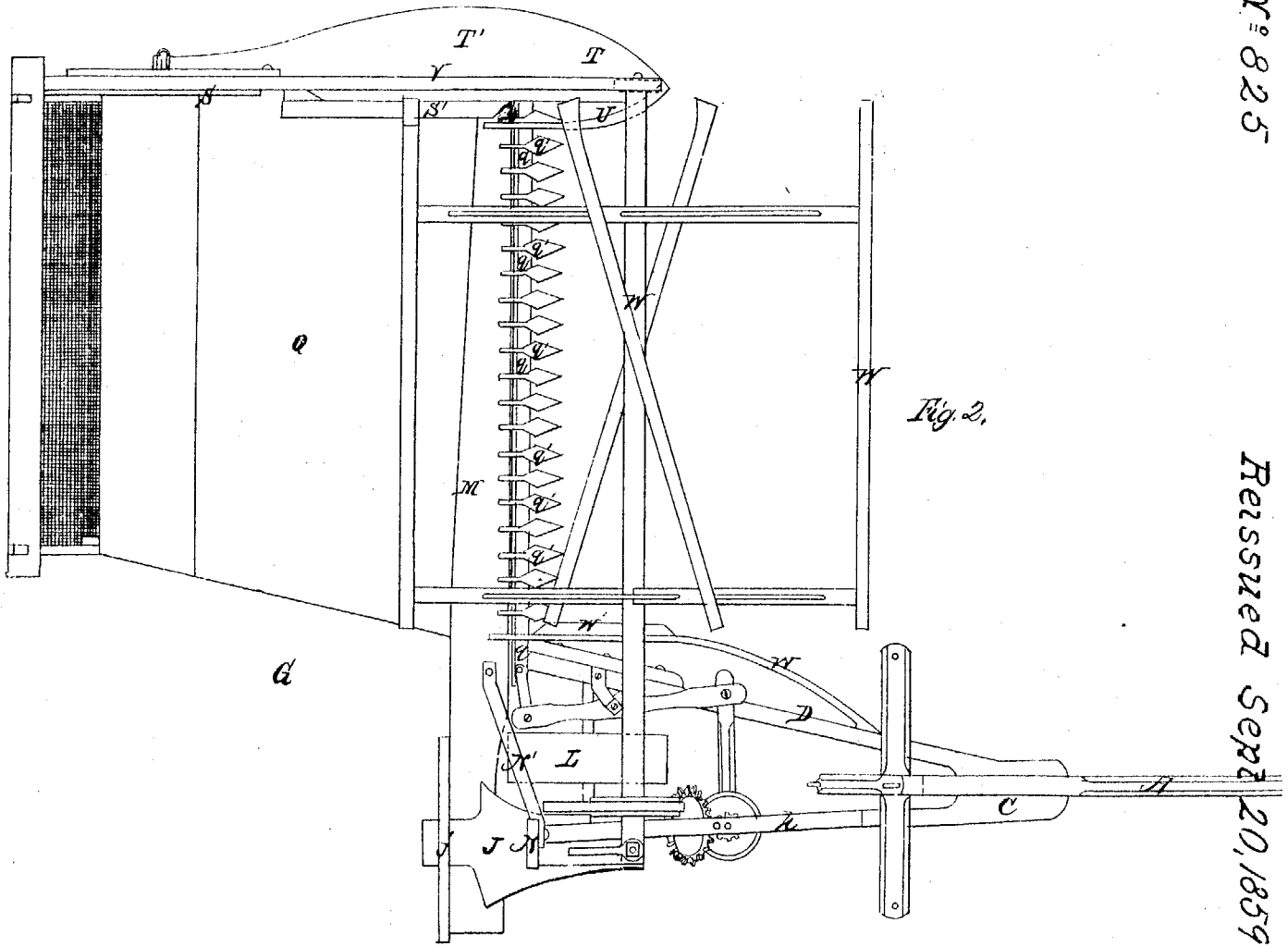
Figure 3:
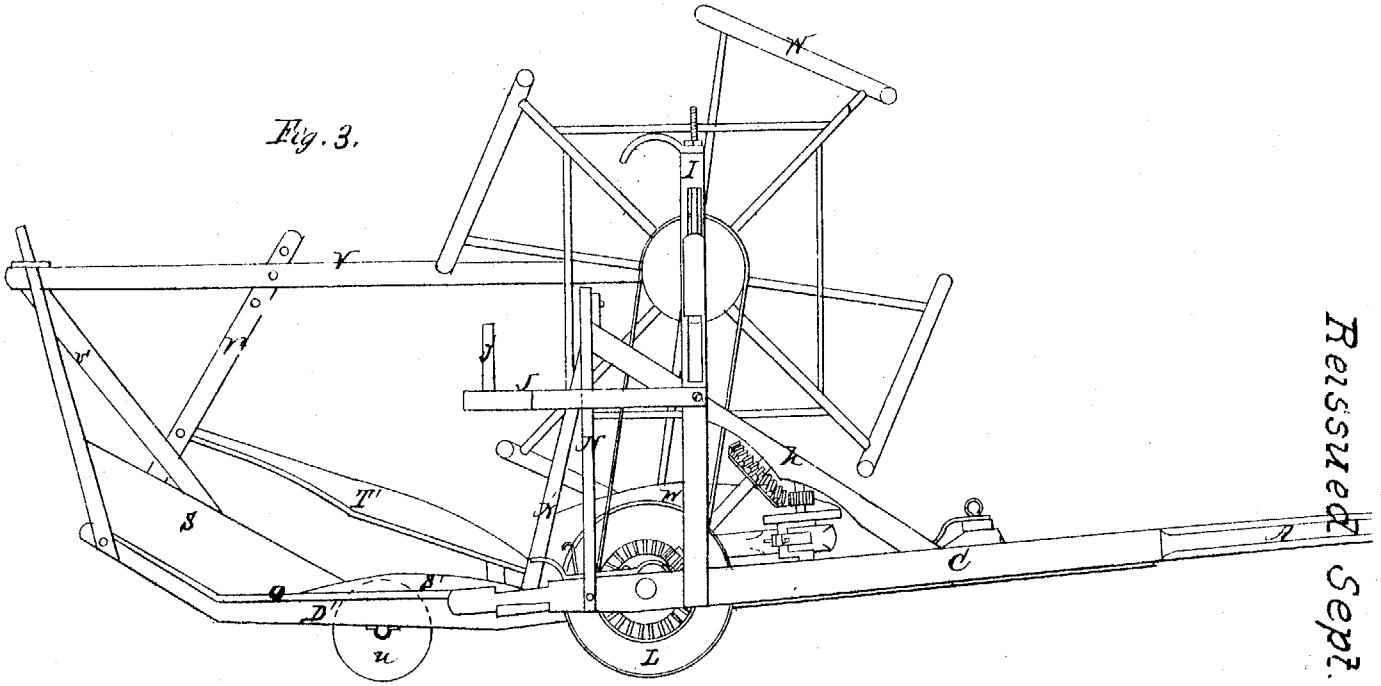
Figure 4:
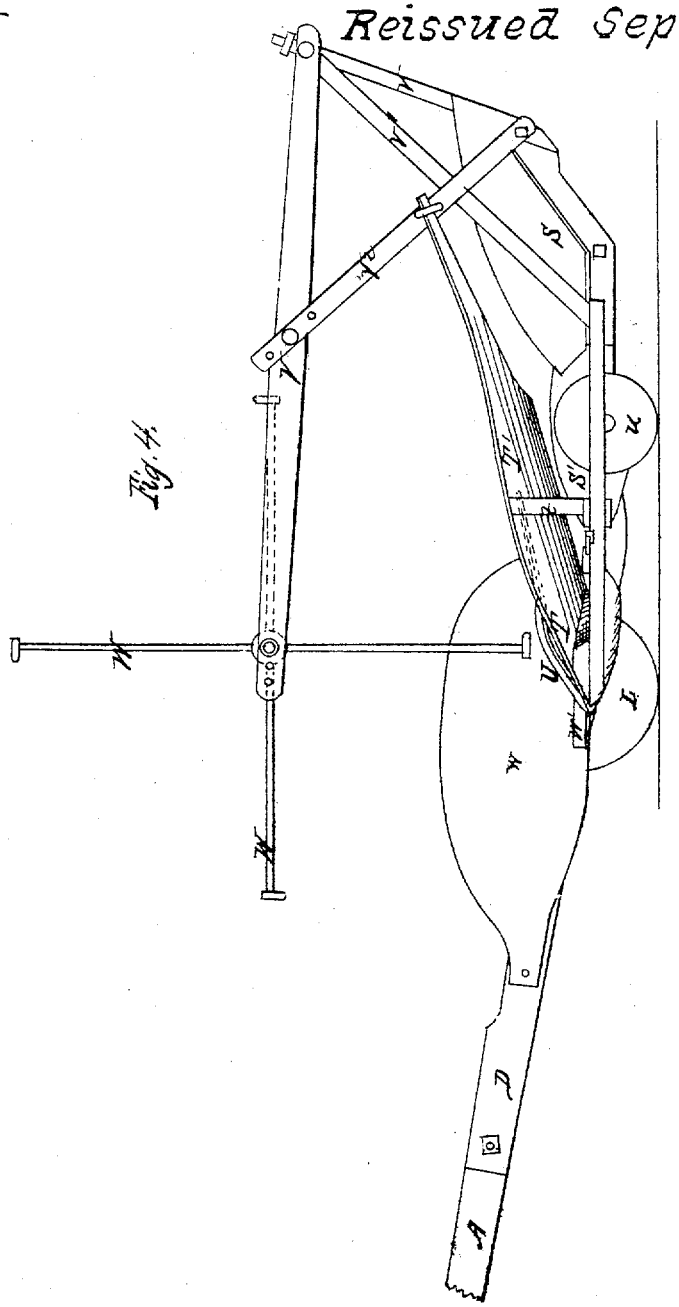
Figure 5:
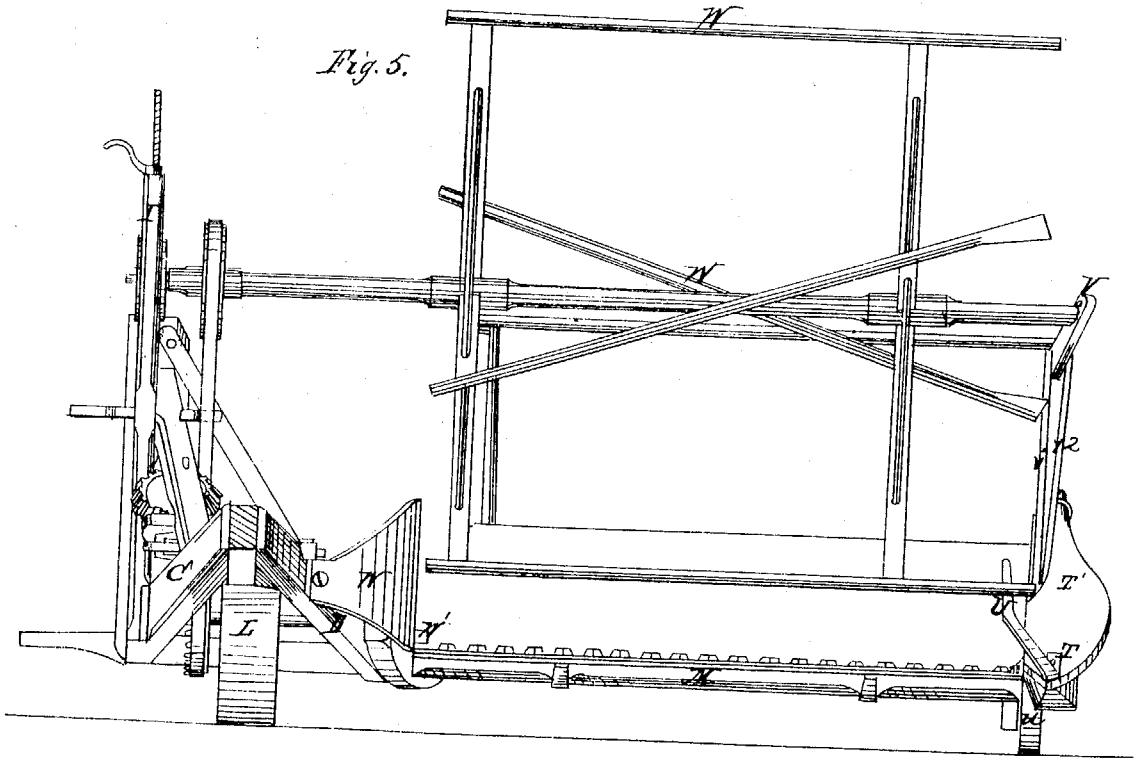
Figure 6:
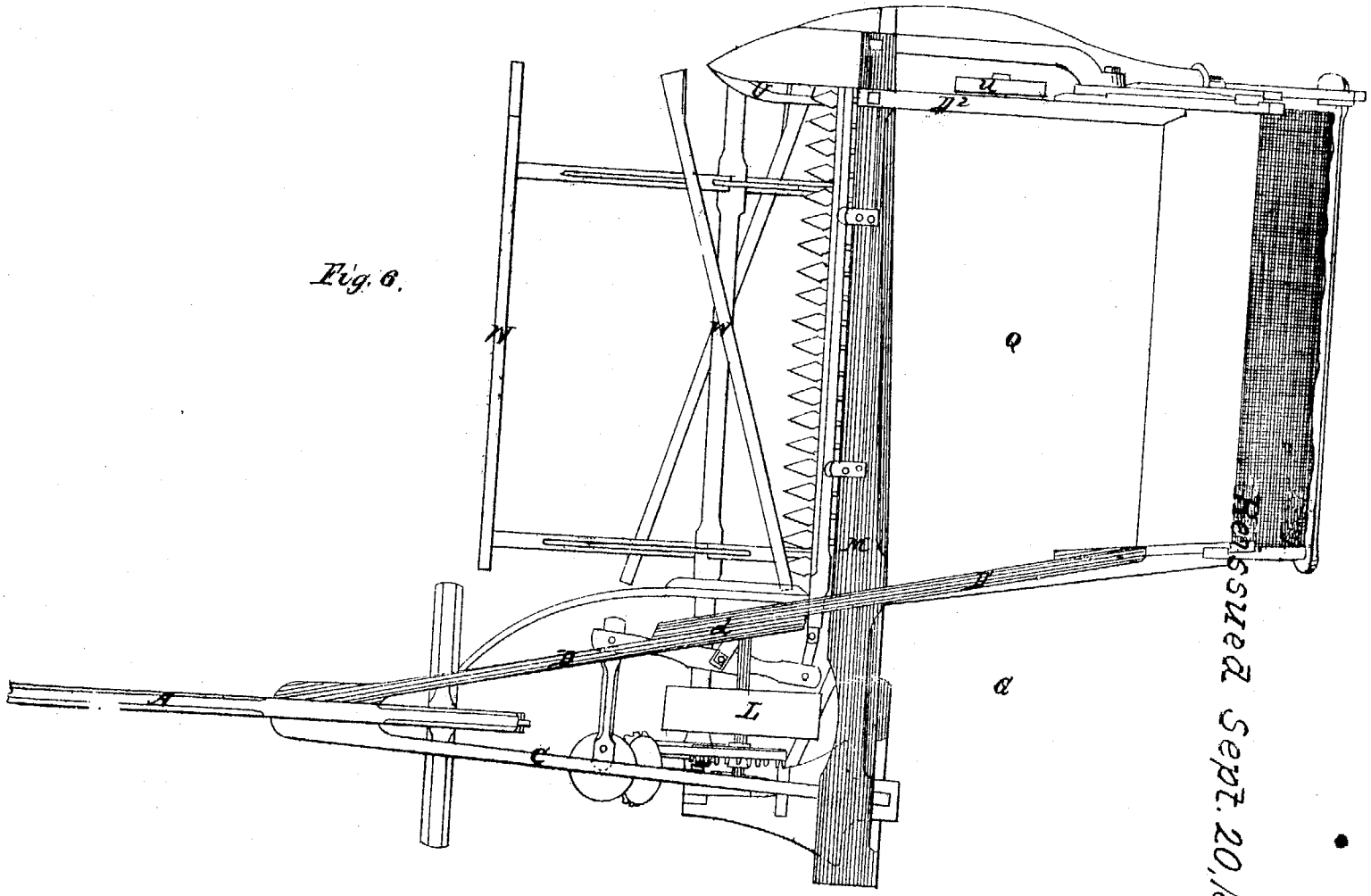

Figure 1 represents in perspective a side-draft-reel reaping-machine embracing my said improvement. Fig. 2 represents a plan of such a machine as seen from above. Fig. 3 represents an elevation of the inner side of the machine. Fig. 4 represents an elevation of the outer side of the machine. Fig. 5 represents an elevation of the front of the machine, and Fig. 6 represents a view of the under side of the machine.

That side of the machine to which the horses are attached, and which runs next the stubble, I call the "inner" side, and the opposite side of the machine, which runs next the uncut grain, I call the "outer" side of the machine.

In the planning of a side-draft and side-delivery reaping-machine it is an important consideration to arrange the platform and the driving-wheel and gearing entirely out of the way of the delivery and gaveling of the grain without disturbing the equilibrium of the machine or rendering its general strength and rigidity insufficient. These conditions are all fulfilled by an improved arrangement of parts which I have invented, and which consists in arranging the driving-wheel and the gearing, the platform, and the finger-beam in such manner that the gearing shall be arranged at that part of the finger-beam which projects beyond the inner side of the platform without interfering with the discharge of the grain at that side of the platform or the deposit of the gavel upon the ground in a convenient position at the side of the swath.

In the drawings I have shown this improvement applied to a McCormick reaping-machine, but deem it unnecessary to describe in detail any more of that machine than is needful to a proper understanding of this improvement.

In the accompanying drawings, M represents a beam called the "finger-piece" or "finger-beam," in the rear of the outer portion of which the platform is placed, and to the inner portion of which the driving-wheel and gearing are connected, so that at the side of the platform and behind the finger-beam there is left a free gaveling-space, G, Fig. 2, unobstructed by any part of the machine that would interfere with the discharge of grain from the side of the platform or its deposit upon the ground in gavels arranged in a convenient position at the side of the swath, either parallel or transversely thereto.

What I claim under this patent as my invention is—

The arrangement of the frame, the finger-beam, the platform, and the driving-wheel and gearing relatively to each other, so as to secure an unobstructed gaveling-space, G, at the side of the platform behind the finger-beam, substantially as herein described.

In testimony whereof I have hereunto signed my name.

C. H. McCORMICK.

In presence of—
P. H. WATSON,
JOHN S. HOLLINGSHEAD.